United States Patent
Pan

(10) Patent No.: US 11,126,074 B2
(45) Date of Patent: Sep. 21, 2021

(54) ILLUMINATION SYSTEM AND PROJECTION APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/835,317

(22) Filed: Mar. 31, 2020

(65) Prior Publication Data
US 2020/0319542 A1   Oct. 8, 2020

(30) Foreign Application Priority Data

Apr. 2, 2019 (CN) .......................... 201910261859.0

(51) Int. Cl.
*G03B 21/20* (2006.01)
*H04N 9/31* (2006.01)

(52) U.S. Cl.
CPC ....... *G03B 21/204* (2013.01); *G03B 21/2013* (2013.01); *G03B 21/2066* (2013.01);
(Continued)

(58) Field of Classification Search
CPC .... G03B 21/28; G03B 21/145; G03B 21/204; G03B 21/208; G03B 21/2013; G03B 21/2033; G03B 21/2066; G03B 21/2073; G03B 33/06; G03B 33/12; H04N 9/315; H04N 9/3114; H04N 9/3117;
(Continued)

(56) References Cited

U.S. PATENT DOCUMENTS

| 2004/0189948 A1 | 9/2004 | Okuyama et al. |
| 2006/0044515 A1 | 3/2006 | Suzuki |
| 2013/0271673 A1* | 10/2013 | Katou .................... G03B 33/12 348/744 |

(Continued)

FOREIGN PATENT DOCUMENTS

| CN | 1651974 | 8/2005 |
| CN | 101782688 | 7/2010 |

(Continued)

OTHER PUBLICATIONS

"Office Action of China Counterpart Application", dated May 20, 2021, p. 1-p. 8.

*Primary Examiner* — Sultan Chowdhury
(74) *Attorney, Agent, or Firm* — JCIPRNET

(57) ABSTRACT

An illumination system and a projection apparatus are provided. The illumination system includes an excitation light source, an auxiliary light source emitting an auxiliary light beam, and a dichroic device located on a transmission path of the auxiliary light beam. The auxiliary light beam has a first polarization light beam having a first polarization state and a second polarization light beam having a second polarization state. A ratio of light intensity of the first polarization light beam to light intensity of the second polarization light beam is greater than or equal to 20. The dichroic device provides a light beam having the first polarization state and a first wavelength with transmittance of 50% and provides the light beam having the second polarization state and a second wavelength with transmittance of 50% when an angle at which the light beam enters the dichroic device is greater than a predetermined angle.

20 Claims, 12 Drawing Sheets

(52) U.S. Cl.
CPC ....... G03B 21/2073 (2013.01); H04N 9/3158 (2013.01); H04N 9/3167 (2013.01)

(58) Field of Classification Search
CPC .. H04N 9/3152; H04N 9/3155; H04N 9/3158; H04N 9/3161; H04N 9/3164; H04N 9/3167; F21V 9/14; F21V 9/30; F21V 9/32; F21V 9/45
See application file for complete search history.

(56) References Cited

U.S. PATENT DOCUMENTS

| | | | |
|---|---|---|---|
| 2015/0062543 A1* | 3/2015 | Ogawa | G03B 21/204 353/84 |
| 2015/0316775 A1* | 11/2015 | Hsieh | G03B 21/204 353/31 |
| 2016/0041399 A1 | 2/2016 | Huang | |

FOREIGN PATENT DOCUMENTS

| | | |
|---|---|---|
| CN | 102549477 | 7/2012 |
| CN | 103353703 | 10/2013 |
| CN | 103631075 | 3/2014 |
| CN | 104020632 | 9/2014 |
| CN | 104520767 | 4/2015 |
| CN | 105022214 | 11/2015 |
| CN | 106324966 | 1/2017 |
| CN | 206096738 | 4/2017 |
| CN | 107209447 | 9/2017 |
| CN | 208547769 | 2/2019 |
| CN | 209707898 | 11/2019 |
| EP | 2485089 | 8/2012 |
| EP | 3367162 | 8/2018 |
| JP | 2002372686 | 12/2002 |
| JP | 2017167415 | 9/2017 |
| JP | 2017211482 | 11/2017 |

* cited by examiner

ILLUMINATION SYSTEM AND PROJECTION APPARATUS

CROSS-REFERENCE TO RELATED APPLICATION

This application claims the priority benefit of China application serial no. 201910261859.0, filed on Apr. 2, 2019. The entirety of the above-mentioned patent application is hereby incorporated by reference herein and made a part of this specification.

BACKGROUND

Technical Field

The invention relates to an optical system and an optical apparatus including the optical system, and particularly relates to an illumination system and a projection apparatus.

Description of Related Art

Recently, projection apparatuses using solid-state light sources such as light emitting-diodes (LEDs) and laser diodes are gaining an increasing market share. Generally, in a projection apparatus, excitation light of the solid-state light sources is converted by the wavelength conversion material on the wavelength conversion module, and conversion light of different colors is thereby generated. In order to satisfy the needs for color performance, a filter module is disposed at the rear segment of the optical path of the projection apparatus, and the conversion light formed by the wavelength conversion module passes through the filter module and is then filtered into the predetermined color light. The color light is modulated by the light valve to form the image beam, and the image beam is then projected to the outside.

Nevertheless, at present, red phosphor powder featuring high conversion efficiency and heat resistance is not available. Therefore, in the related art, in a projection apparatus adopting the laser diodes, in order to produce red light and green light, the most cost-effective way is to excite the region having green or yellow phosphor powder in the wavelength conversion module by using the blue light laser diodes to generate yellow light or green light. Moreover, the wavelength conversion region having the green phosphor powder corresponds to the green filter region of the filter module, so that the expected green light is filtered out from the green conversion light. The wavelength conversion region having the yellow phosphor powder corresponds to the yellow filter region of the filter module, so that the expected red light and yellow are filtered out from the yellow conversion light.

Nevertheless, the red color light accounts for only a small portion in the yellow light spectrum waveband. In the projection apparatus, the red light is not red enough and leans towards orange most of the time, or brightness of the red light is not bright enough and leans towards dark red, so overall color performance of the image frame is thereby affected. In order to solve the problem of poor red light performance in the image frame, in the related art, an additional red auxiliary light source is adopted for making improvement. A dichroic device is required to be disposed for the red auxiliary light source to be combined with the conversion light formed by the wavelength conversion module. Nevertheless, the light-emitting spectrum of red light of the red light auxiliary light source overlaps with the light-emitting spectrum of conversion light of the wavelength conversion module. As such, when such combination is made, in order to allow the red light of the red auxiliary light source to pass through the dichroic device, one part of the conversion light of the wavelength conversion module may not be transmitted onto the subsequent optical device as the dichroic device is disposed, so that loss of light efficiency is generated.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an illumination system capable of allowing an outputted light beam to exhibit favorable color performance and light efficiency.

The invention further provides a projection apparatus capable of providing an image frame featuring favorable color performance.

Other features and advantages of the embodiments of the invention are illustrated by the technical features broadly embodied and described as follows.

In order to achieve one or part of or all of the features, an embodiment of the invention provides an illumination system. An illumination system provided by an embodiment of the invention is configured to provide an illumination beam, and the illumination system includes an excitation light source, an auxiliary light source, and a dichroic device. The excitation light source is configured to emit an excitation light beam. The auxiliary light source is configured to emit an auxiliary light beam. The auxiliary light beam has a first polarization light beam and a second polarization light beam. The first polarization light beam has a first polarization state, and the second polarization light beam has a second polarization state. A value of ratio of light intensity of the first polarization light beam to light intensity of the second polarization light beam is greater than or equal to 20. The dichroic device is located on the transmission path of the auxiliary light beam. When an angle at which a light beam enters the dichroic device is greater than a predetermined angle, the dichroic device provides the light beam having the first polarization state and having a first wavelength with transmittance of 50% and provides the light beam having the second polarization state and having a second wavelength with transmittance of 50%. The first wavelength is different from the second wavelength, and the first wavelength is less than or equal to a dominant wavelength of the auxiliary light beam.

In order to achieve one or part of or all of the features, an embodiment of the invention provides a projection apparatus. The projection apparatus includes the abovementioned illumination system, a light valve, and a projection lens. The light valve is located on a transmission path of the illumination beam and is configured to form the illumination beam into an image beam. The projection lens is located on a transmission path of the image beam and is configured to form the image beam into a projection light beam.

To sum up, the embodiments of the invention have at least one of the following advantages or effects. In the embodiments of the invention, as the auxiliary light source is disposed in the illumination system adopting the specific dichroic device, the ratio of red light in the illumination beam is increased, so that the performance of red color in the projection frame is enhanced. Moreover, as the specific dichroic device is disposed in the illumination system, the outputted light beam may thereby exhibit favorable color performance and light efficiency. Further, the projection apparatus adopting the illumination system having the specific dichroic device may thereby present favorable color performance and image frames.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
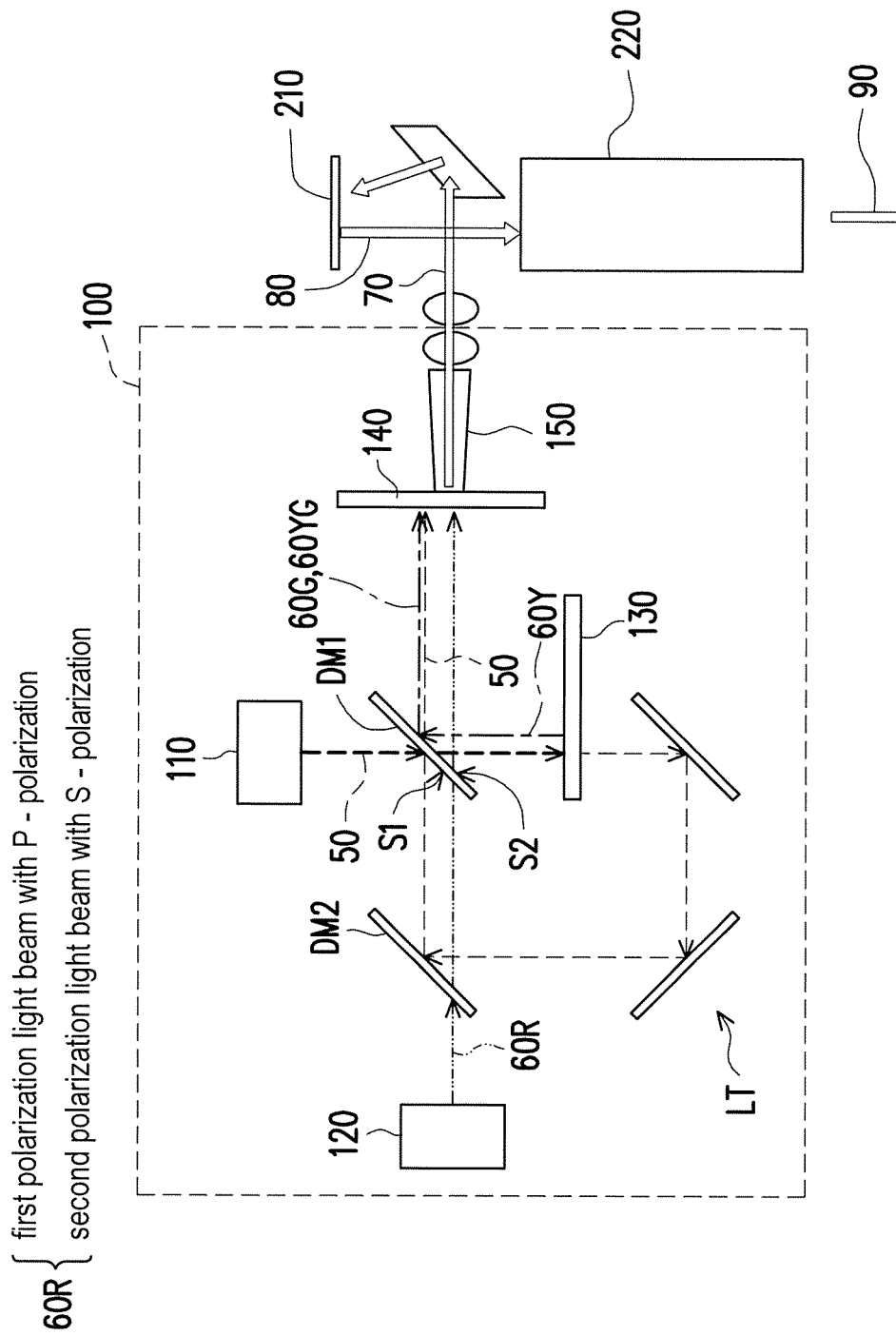
FIG. 1 is a schematic diagram of an optical structure of a projection apparatus according to an embodiment of the invention.

FIG. 1 is a schematic diagram of an optical structure of a projection apparatus according to an embodiment of the invention. With reference to FIG. 1, a projection apparatus 200 includes an illumination system 100, a light valve 210, and a projection lens 220. For instance, in this embodiment, the light valve 210 is, for example, a digital micro-mirror device (DMD) or a liquid-crystal-on-silicon panel (LCOS panel). Nevertheless, in other embodiments, the light valve 210 may also be a transmissive liquid crystal panel or other beam modulators, and a number of the light valve 210 is not limited.

To be specific, as shown in FIG. 1, in the embodiment, the illumination system 100 is configured to provide an illumination beam 70, and the illumination system 100 includes an excitation light source 110, an auxiliary light source 120, a wavelength conversion module 130, a dichroic device DM1, and a light transmission module LT. The excitation light source 110 is configured to emit an excitation light beam 50. For instance, in the embodiment, the excitation light source 110 is a blue light laser light source, and the excitation light beam 50 is a blue laser light beam. The excitation light source 110 may include, for example, a plurality of blue light laser diodes (not shown) arranged in an array, but the invention is not limited thereto. The auxiliary light source 120 is configured to emit an auxiliary light beam 60R. For instance, in the embodiment, the auxiliary light source 120 is, for example, a red light laser light source, and the auxiliary light beam 60R is red light.

To be more specific, in the embodiment, the auxiliary light source 120 is a polarization light source, and the auxiliary light beam 60R has a first polarization light beam and a second polarization light beam. The first polarization light beam has a first polarization state, and the second polarization light beam has a second polarization state. Further, a value of ratio of light intensity of the first polarization light beam to light intensity of the second polarization light beam is greater than or equal to 20. The first polarization state (e.g., a P polarity polarization direction) is perpendicular to the second polarization state (e.g., an S polarity polarization direction). Further, when the auxiliary light beam 60R is a red light laser light beam, the auxiliary light beam 60R emits light in a specific polarization direction. Herein, the ratio of the light intensity of the first polarization light beam to the light intensity of the second polarization light beam is between, for example, 98% and 99%. In addition, a wavelength conversion light beam 60Y has the third polarization light beam and the fourth polarization light beam. The third polarization light beam has the first polarization state, and the fourth polarization light beam has the second polarization state.

To be specific, as shown in FIG. 1, in the embodiment, the wavelength conversion module 130 is located on a transmission path of the excitation light beam 50 and is configured to convert the excitation light beam 50 to at least one wavelength conversion light beam 60Y. The dichroic device DM1 is located on the transmission paths of the excitation light beam 50 and the at least one wavelength conversion light beam 60Y. The dichroic device DM1 is, for example, a dichroic mirror. For instance, in the embodiment, the dichroic device DM1 may be a dichroic mirror (DMGO) which reflects a light beam of green-orange wavelength spectrum, thereby allows blue light and red light to penetrate through, and reflects green light and orange light. Therefore, the dichroic device DM1 may allow the blue excitation light beam 50 to penetrate through. In this way, the excitation light beam 50 of the excitation light source 110 may be transmitted to the wavelength conversion module 130 by penetrating through the dichroic device DM1.

From another perspective, as shown in FIG. 1, at least one wavelength conversion region (not shown) of the wavelength conversion module 130 is configured to convert the excitation light beam 50 to the at least one wavelength conversion light beam 60Y, and a non-conversion region (not shown) of the wavelength conversion module 130 is configured to allow the excitation light beam 50 to pass through to be transmitted to a subsequent light transmission module LT. For instance, in this embodiment, the wavelength conversion module 130 may be a rotational phosphor wheel and include a first actuator (not shown) and is configured to set the non-conversion region (not shown) and the at least one wavelength conversion region (not shown) to be within an irradiation range of the excitation light beam 50 at different times, so that the excitation light beam 50 is selectively set to pass through or to be converted into the at least one wavelength conversion light beam 60Y. The non-conversion region is, for example, is a light transmissive device (glass piece) or an opening.

To be more specific, as shown in FIG. 1, in this embodiment, when the non-conversion region (not shown) of the wavelength conversion module 130 is within the irradiation range of the excitation light beam 50, the excitation light beam 50 penetrates through the wavelength conversion module 130 and is transmitted by the light transmission module LT and then is guided to the dichroic device DM1. From another perspective, in this embodiment, when the at least one wavelength conversion region (not shown) is within the irradiation range of the excitation light beam 50, the excitation light beam 50 is converted into the at least one wavelength conversion light beam 60Y by the at least one wavelength conversion region (not shown). For instance, in this embodiment, yellow phosphor powder which may be excited to form a yellow light beam is provided at the at least one wavelength conversion region of the wavelength conversion module 130, so that the excitation light beam may 50 be turned into yellow light. In other words, in this embodiment, the at least one wavelength conversion light beam 60Y formed from the excitation light beam 50 converted by the at least one wavelength conversion region is yellow light. Next, as shown in FIG. 1, the at least one wavelength conversion light beam 60Y from the wavelength conversion module 130 may be guided (reflected) onto the dichroic device DM1.

From another perspective, as shown in FIG. 1, in this embodiment, a dichroic device DM2 is further included in the light transmission module LT of the illumination system 100, is located on the transmission path of the excitation light beam 50 penetrating through the wavelength conversion module 130, and is located on a transmission path of the auxiliary light beam 60R. In this embodiment, the dichroic device DM2 may be a dichroic mirror (DMB) capable of, for example, reflecting blue light and thereby allows red light to penetrate through and reflects blue light. In this way, the auxiliary light beam 60R of the auxiliary light source 120 may penetrate through the dichroic device DM2 and is transmitted to the dichroic device DM1, and the excitation light beam 50 may still be transmitted to the dichroic device DM1 through the light transmission module LT.

To be specific, as shown in FIG. 1, in this embodiment, the dichroic device DM1 is located on the transmission paths of the auxiliary light beam 60R and the wavelength conversion light beam 60Y, and the dichroic device DM1 has a first surface S1 and a second surface S2 opposite to each other. When the excitation light beam 50, the auxiliary light beam 60R, and the wavelength conversion light beam 60Y are transmitted to the dichroic device DM1, the auxiliary light beam 60R enters the dichroic device DM1 through one of the first surface S1 and the second surface S2, the at least one wavelength conversion light beam 60Y enters the dichroic device DM1 through the other one of the first surface S1 and the second surface S2, and both the auxiliary light beam 60R and the at least one wavelength conversion light beam 60Y exit the dichroic device DM1 through the same one of the first surface S1 and the second surface S2.

To be more specific, as shown in FIG. 1, in this embodiment, the first surface S1 of the dichroic device DM1 faces the excitation light source 110 and the auxiliary light source 120, and the second surface S2 faces the wavelength conversion module 130. Further, as shown in FIG. 1, the first surface S1 of the dichroic device DM1 faces the auxiliary light beam 60R from the auxiliary light source 120, and the second surface S2 faces the wavelength conversion light beam 60Y from the wavelength conversion module 130. In this way, as shown in FIG. 1, in this embodiment, the auxiliary light beam 60R enters the dichroic device DM1 from the first surface S1 and then penetrates through the dichroic device DM1 and exits the dichroic device DM1 through the second surface S2. The at least one wavelength conversion light beam 60Y enters the dichroic device DM1 through the second surface S2 and is then reflected by the dichroic device DM1 and exits the dichroic device DM1 through the second surface S2 as well.

The process of the auxiliary light beam 60R and the wavelength conversion light beam 60Y passing through the dichroic device DM1 is further explained with reference to FIG. 2A.

Figure 2A:
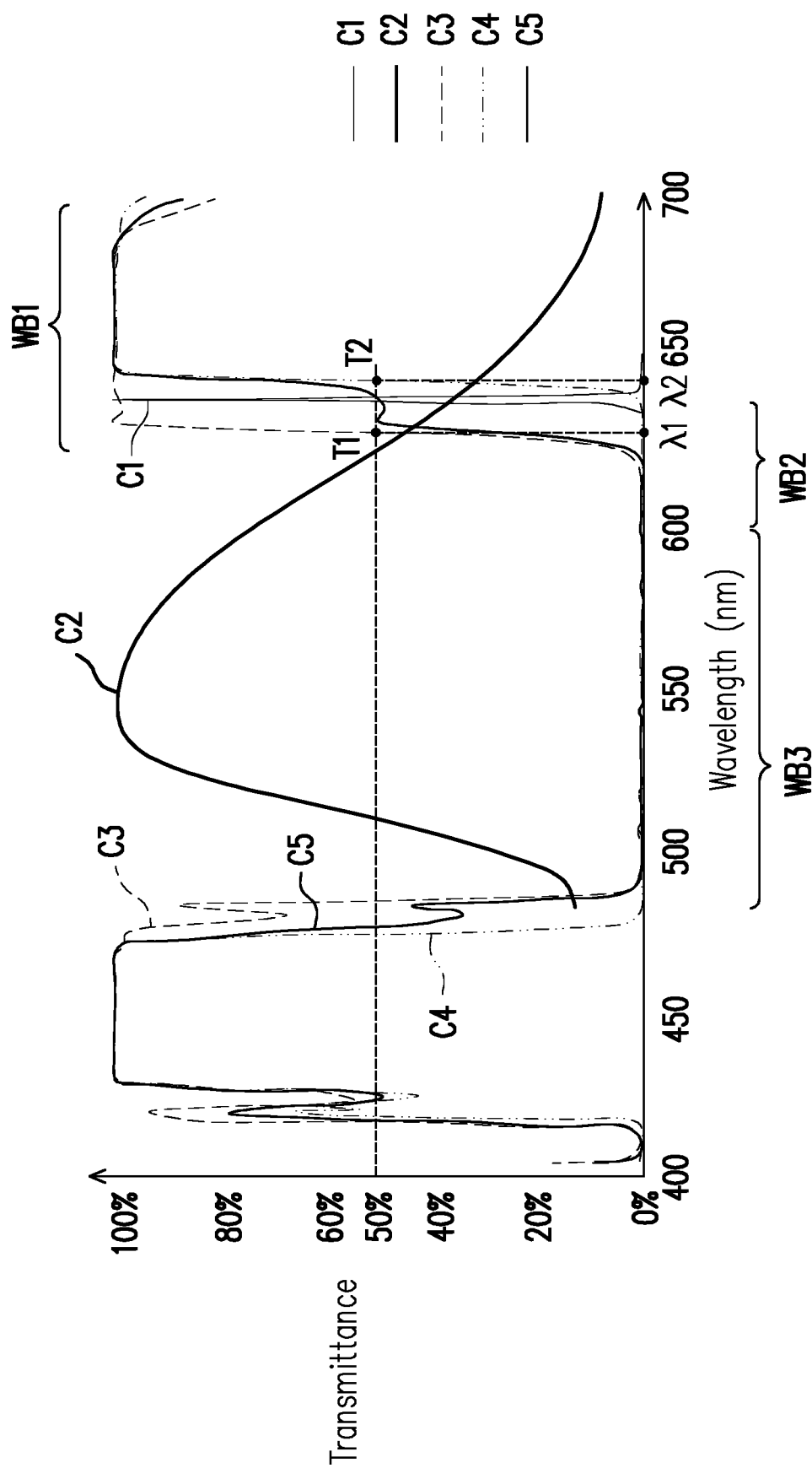
FIG. 2A is a graph showing relations between different wavelengths and transmittance of light beams passing through a dichroic device of FIG. 1.

FIG. 2A is a graph showing relations between different wavelengths and transmittance of light beams passing through the dichroic device DM1 of FIG. 1. As shown in FIG. 2A, in this embodiment, a curve C1 represents a light-emitting spectrum of the auxiliary light beam 60R. A curve C2 represents a light-emitting spectrum of the wavelength conversion light beam 60Y. A curve C3 represents transmittance provided by the dichroic device DM1 for color light having the first polarization state in different wavebands when an angle at which a light beam enters the dichroic device DM1 is greater than a predetermined angle. A curve C4 represents transmittance provided by the dichroic device DM1 for color light having the second polarization state in different wavebands when an angle at which a light beam enters the dichroic device DM1 is greater than the predetermined angle. A curve C5 represents transmittance provided by the dichroic device DM1 for color light having no specific polarization state in different wavebands. For instance, the predetermined angle may be 35 degrees.

As shown by the curves C3, C4, and C5 of FIG. 2A, in this embodiment, the dichroic device DM1 is configured to allow first color light having a light-emitting wavelength range falling within a first waveband WB1 to penetrate through. For instance, in this embodiment, a range of the first waveband WB1 is, for example, greater than or equal to 610 nanometers (nm). As shown by the curve C1 of FIG. 2A, a dominant wavelength of the auxiliary light beam 60R is, for example, 638 nm. In other words, in this embodiment, the first color light is red light, and a light-emitting wavelength range of the auxiliary light beam 60R falls within the first waveband WB1 and thereby is configured to pass through the dichroic device DM1.

More specifically, as shown by the curve C3 of FIG. 2A, when an angle at which a light beam enters the dichroic device DM1 is greater than the predetermined angle, for example, greater than 35 degrees, the curve C3 has a first half-through point T1. The first half-through point T1 refers to a point of transmittance of 50% provided to a light beam having the first polarization state and having a first wavelength $\lambda 1$ by the dichroic device DM1. Further, as shown by the curve C4 of FIG. 2A, when an angle at which a light beam enters the dichroic device DM1 is greater than the predetermined angle, for example, greater than 35 degrees, the curve C4 has a second half-through point T2, and a light beam having the second polarization state and having a second wavelength $\lambda 2$ is provided with the transmittance of 50%. In other words, when a dominant wavelength of the light beam having the first polarization state is greater than the first wavelength $\lambda 1$, a major portion (greater than 50%) of the light beam may pass through the dichroic device DM1. When a dominant wavelength of the light beam having the second polarization state is greater than the second wavelength $\lambda 2$, a major portion (greater than 50%) of the light beam may pass through the dichroic device DM1 as well. More specifically, as shown in FIG. 2A, in this embodiment, the first wavelength $\lambda 1$ is different from the second wavelength $\lambda 2$, and the second wavelength $\lambda 2$ is greater than the first wavelength $\lambda 1$. For instance, as shown in FIG. 2A, in this embodiment, the first wavelength $\lambda 1$ is greater than or equal to 615 nm and may be 620 nm, and the second wavelength $\lambda 2$ may be 645 nm. Further, a difference between the first wavelength $\lambda 1$ and the second wavelength $\lambda 2$ is greater than or equal to 5 nm.

Moreover, the auxiliary light source 120 is polarization light, and in the auxiliary light beam 60R, a value of ratio of light intensity of the first polarization light beam having the first polarization state to light intensity of the second polarization light beam having the second polarization state is greater than or equal to 20. Therefore, in the embodiment, as long as the first wavelength $\lambda 1$ is controlled to be less than or equal to the dominant wavelength of the auxiliary light beam 60R, 90% or greater of the auxiliary light beam 60R may pass through the dichroic device DM1. For instance, as shown by FIG. 2A, in this embodiment, a value of the dominant wavelength of the auxiliary light beam 60R is between that of the first wavelength $\lambda 1$ and that of the second wavelength $\lambda 2$. That is, the first wavelength $\lambda 1$ is less than or equal to the dominant wavelength of the auxiliary light beam 60R, and the second wavelength $\lambda 2$ is greater than the dominant wavelength of the auxiliary light beam 60R. Moreover, a difference between the first wavelength $\lambda 1$ and the dominant wavelength of the auxiliary light beam 60R may be greater than or equal to, for example, 3 nm. In addition, in this embodiment, as shown by FIG. 2A, both the first wavelength $\lambda 1$ and the second wavelength $\lambda 2$ are greater than the dominant wavelength of the wavelength conversion light beam 60Y.

From another perspective, as shown by the curves C3, C4, and C5 of FIG. 2A, the dichroic device DM1 is configured to reflect second color light 60YG having a light-emitting wavelength range falling within a second waveband WB2 and third color light 60G having a light-emitting wavelength range falling within a waveband WB3. For instance, in this embodiment, a range of the second waveband WB2 is between for example, 600 nm and 630 nm, and preferably 600 nm and 620 nm, and a range of the third waveband WB3 is between, for example, 490 nm and 600 nm. In other words, in this embodiment, the second color light 60YG is yellow green light, and the third color light 60G is green light. Further, as shown by the curve C2 of FIG. 2A, a light-emitting wavelength range of the wavelength conversion light beam 60Y includes the first waveband WB1, the second waveband WB2, and the third waveband WB3. As such, in the wavelength conversion light beam 60Y, light beams having the light-emitting wavelength ranges falling within the second waveband WB2 and the third waveband WB3 are configured to be reflected by the dichroic device DM1. In other words, in this embodiment, a portion of the wavelength conversion light beam 60Y is reflected by the dichroic device DM1 to form the second color light 60YG and the third color light 60G. In this way, the excitation light beam 50, the auxiliary light beam 60R, and the second color light 60YG and the third color light 60G of the wavelength conversion light beam 60Y may be transmitted to a subsequent filter module 140 after exiting the dichroic device DM1 and then are combined to form the illumination beam 70.

For instance, as shown in FIG. 1, the projection apparatus 200 further includes the filter module 140. The filter module 140 is located on the transmission paths of the excitation light beam 50, the auxiliary light beam 60R, and the second color light 60YG and the third color light 60G of the wavelength conversion light beam 60Y and has a filter optical region (not shown) and a light transmissive region (not shown). The filter module 140 further includes a second actuator (not shown) and is configured to set the filter optical region (not shown) to be correspondingly within irradiation ranges of the auxiliary light beam 60R and the second color light 60YG and the third color light 60G of the wavelength conversion light beam 60Y at different times, so as to form red color light and green color light. From another perspective, the light transmissive region (not shown) is correspondingly within the irradiation range of the excitation light beam 50 transmitted to the filter module 140 at different times, so as to form blue color light. In other embodiments, a diffusing structure configured to eliminate a laser speckle generated by the excitation light beam 50 may be added to the light transmissive region of the filter module 140. The diffusing structure may also be added to the filter optical region, so as to be used to eliminate a laser speckle generated by the auxiliary light beam 60R. In this way, the excitation light beam 50, the auxiliary light beam 60R, and the second color light 60YG and the third color light 60G of the wavelength conversion light beam 60Y forms the illumination beam 70 having different colors in sequence.

From another perspective, as shown by FIG. 1, in the embodiment, the projection apparatus 200 further includes a light homogenizing device 150 located on a transmission path of the illumination beam 70. In the embodiment, the light homogenizing device 150 is, for example, an integration rod, but the invention is not limited thereto. More specifically, as shown in FIG. 1, when the illumination beam 70 is transmitted to the light homogenizing device 150, the light homogenizing device 150 may homogenize the illumination beam 70 and sets the illumination beam 70 to be transmitted to the light valve 210.

Next, as shown in FIG. 1, the light valve 210 is located on the transmission path of the illumination beam 70 and is configured to form the illumination beam 70 into an image beam 80. The projection lens 220 is located on a transmission path of the image beam 80 and is configured to form the image beam 80 into a projection light beam 90, so as to project the image beam 80 onto a screen (not shown) to form an image frame. After the illumination light beam 70 irradiates the light valve 210, the light valve 210 sequentially modulates the illumination light beam 70 into the image beam 80 of different colors for transmitting to the projection lens 220. In this way, the projected image frame of the image beam 80 converted by the light valve 210 may be a color image.

Figure 2B:
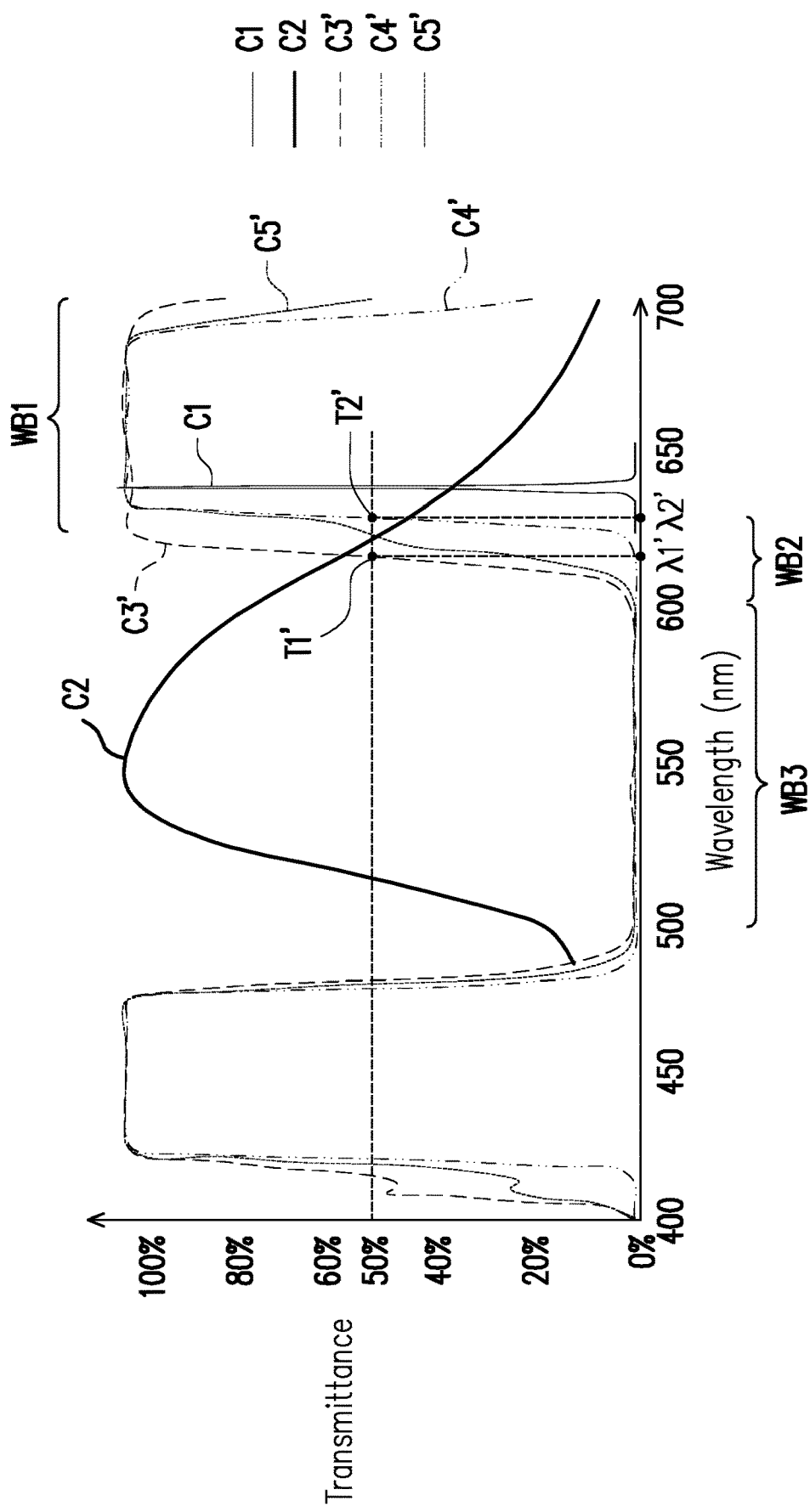
FIG. 2B is a graph showing relations between different wavelengths and transmittance of light beams passing through a dichroic device of a comparative example.
Figure 2C:
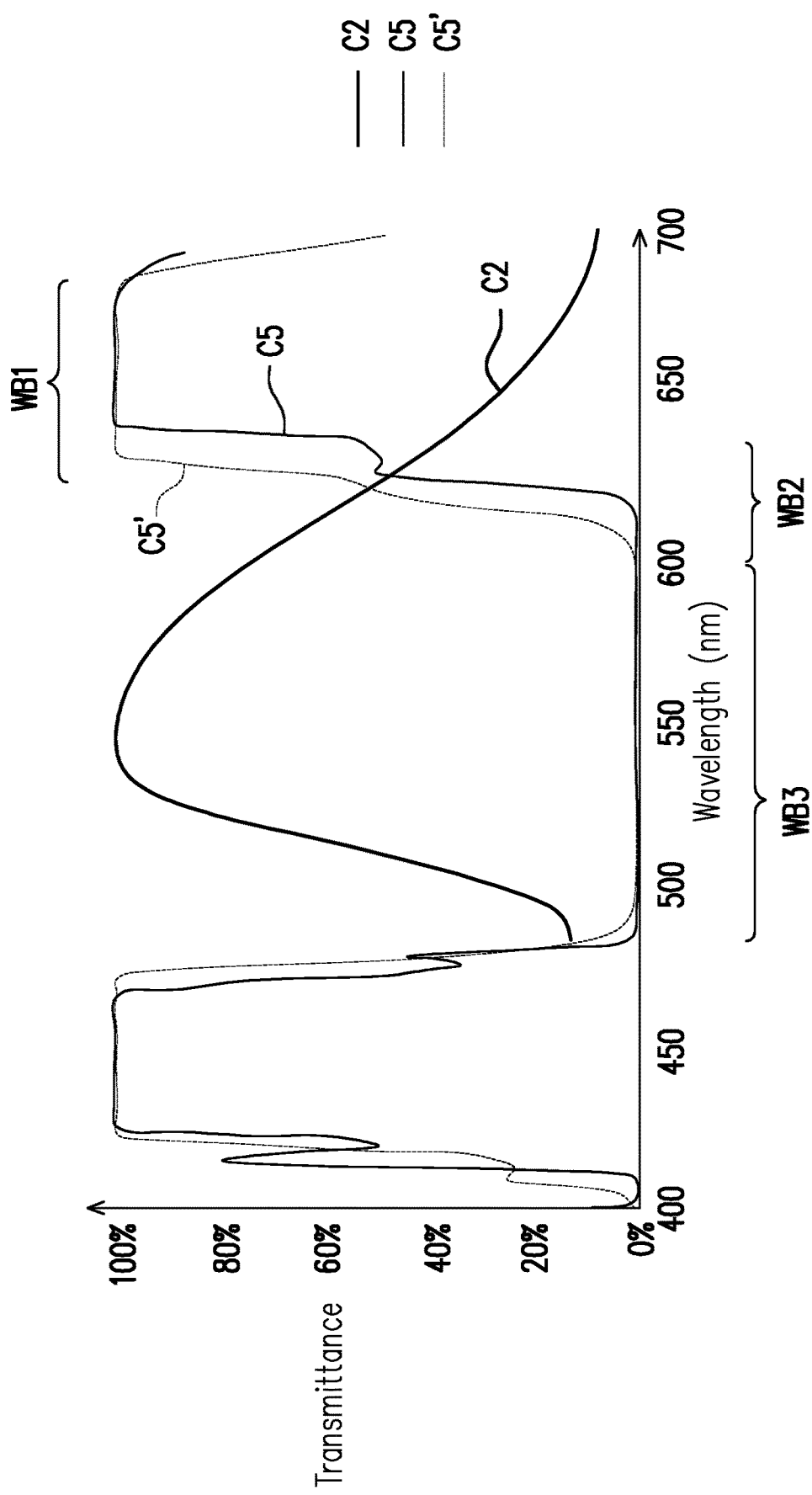
FIG. 2C is a graph showing relations between transmittance and a light-emitting wavelength of a wavelength conversion light beam comparing between the dichroic device of FIG. 1 and the dichroic device of the comparative example of FIG. 2B.

FIG. 2B is a graph showing relations between different wavelengths and transmittance of light beams passing through a dichroic device DM1' of a comparative example. Moreover, the dichroic device DM1' of FIG. 2B is a conventional dichroic device. FIG. 2C is a graph showing relations between transmittance and the light-emitting wavelength of the wavelength conversion light beam 60Y comparing between the dichroic device DM1 of FIG. 1 and the dichroic device DM1' of the comparative example of FIG. 2B. With reference to FIG. 2B and FIG. 2C, a curve C3' represents transmittance provided by the dichroic device DM1' of the comparative example of FIG. 2B for color light having the first polarization state in different wavebands when an angle at which a light beam enters the dichroic device DM1' of the comparative example of FIG. 2B is greater than a predetermined angle. A curve C4' represents transmittance provided by the dichroic device DM1' of the comparative example of FIG. 2B for color light having the second polarization state in different wavebands when an angle at which a light beam enters the dichroic device DM1' of the comparative example of FIG. 2B is greater than the predetermined angle. A curve C5' represents transmittance provided by the dichroic device DM1' of the comparative example of FIG. 2B for color light having no specific polarization state in different wavebands. For instance, the predetermined angle may be 35 degrees.

A difference between the dichroic device DM1' adopted by FIG. 2B and the dichroic device DM1 adopted by FIG. 2A is described as follows. In this embodiment, as regards the dichroic device DM1' adopted by FIG. 2B, as shown by the curve C3', when an angle at which a light beam enters the dichroic device DM1' is greater than the predetermined angle, for example, greater than 35 degrees, the curve C3' has a first half-through point T1'. The first half-through point T1' refers to a point of transmittance of 50% provided to a light beam having the first polarization state and having a first wavelength $\lambda 1'$ by the dichroic device DM1'. Further, as shown by the curve C4', when an angle at which a light beam enters the dichroic device DM1' is greater than the predetermined angle, for example, greater than 35 degrees, the curve C4' has a second half-through point T2', and a light beam having the second polarization state and having a second wavelength $\lambda 2'$ is provided with the transmittance of 50%. Herein, positions of the first half-through point T1' and the second half-through point T2' shown by the curve C3' and the curve C4' on the spectrum are different from that of the first half-through point T1 and the second half-through point T2 of the dichroic device DM1 adopted by FIG. 2A on the spectrum. Compared to the first half-through point T1 and the second half-through point T2, the first half-through point T1' and the second half-through point T2' move to the range of the dominant wavelength of the wavelength conversion light beam 60Y. More specifically, in the comparative example of the dichroic device DM1' adopted by FIG. 2B, the first wavelength $\lambda 1'$ and the second wavelength $\lambda 2'$ are both less than the dominant wavelength of the auxiliary light beam 60R. For instance, as shown by FIG. 2B, in this embodiment, the first wavelength $\lambda 1'$ is approximately 605 nm and the second wavelength $\lambda 2'$ is approximately 630 nm.

As such, as shown by the curves C3', C4', and C5' of FIG. 2B, since the first half-through point T1' and the second half-through point T2' of the curves C3' and C4' move their positions on the spectrum, the curve C5' of FIG. 2B changes as well. The waveband range having transmittance approximately near zero is reduced to between 490 nm and 590 nm. That is, the conventional dichroic device DM1' adopted by FIG. 2B is only configured to reflect the third color light 60G having a light-emitting wavelength range falling within the third waveband WB3. The second color light 60YG having the light-emitting wavelength range falling within the second waveband WB2 penetrates through the conventional dichroic device DM1' adopted by FIG. 2B. The second color light 60YG thereby is not reflected by the conventional dichroic device DM1' and is not transmitted to the subsequent filter module 140, and as such, loss of light efficiency is generated.

In this way, as shown in FIG. 2C, when the dichroic device DM1 adopted by FIG. 2A and the conventional dichroic device DM1' adopted by FIG. 2B are compared, it can be seen that the dichroic device DM1 of FIG. 2A is configured to reflect a light beam having a broader waveband range. Moreover, when the first wavelength $\lambda 1$ is controlled to be less than or equal to the dominant wavelength of the auxiliary light beam 60R, 90% or greater of the auxiliary light beam 60R having the first polarization state may pass through the dichroic device DM1. Therefore, when the auxiliary light beam 60R is ensured to pass through the dichroic device DM1, the dichroic device DM1 adopted by FIG. 2A may allow the second color light 60YG having the light-emitting wavelength range falling within the second waveband WB2 to be reflected by the dichroic device DM1 as well, so that utilization efficiency of the yellow green light is enhanced. In this way, as the auxiliary light source 120 is disposed in the illumination system 100 adopting the dichroic device DM1, the ratio of red light in the illumination beam 70 is increased, so that the performance of red color in the projection frame is enhanced. Moreover, as the dichroic device DM1 is disposed in the illumination system 100, the outputted light beam may thereby exhibit favorable color performance and light efficiency. Further, the projection apparatus 200 adopting the illumination system 100 having the dichroic device DM1 may thereby present favorable color performance and image frames.

Figure 3:
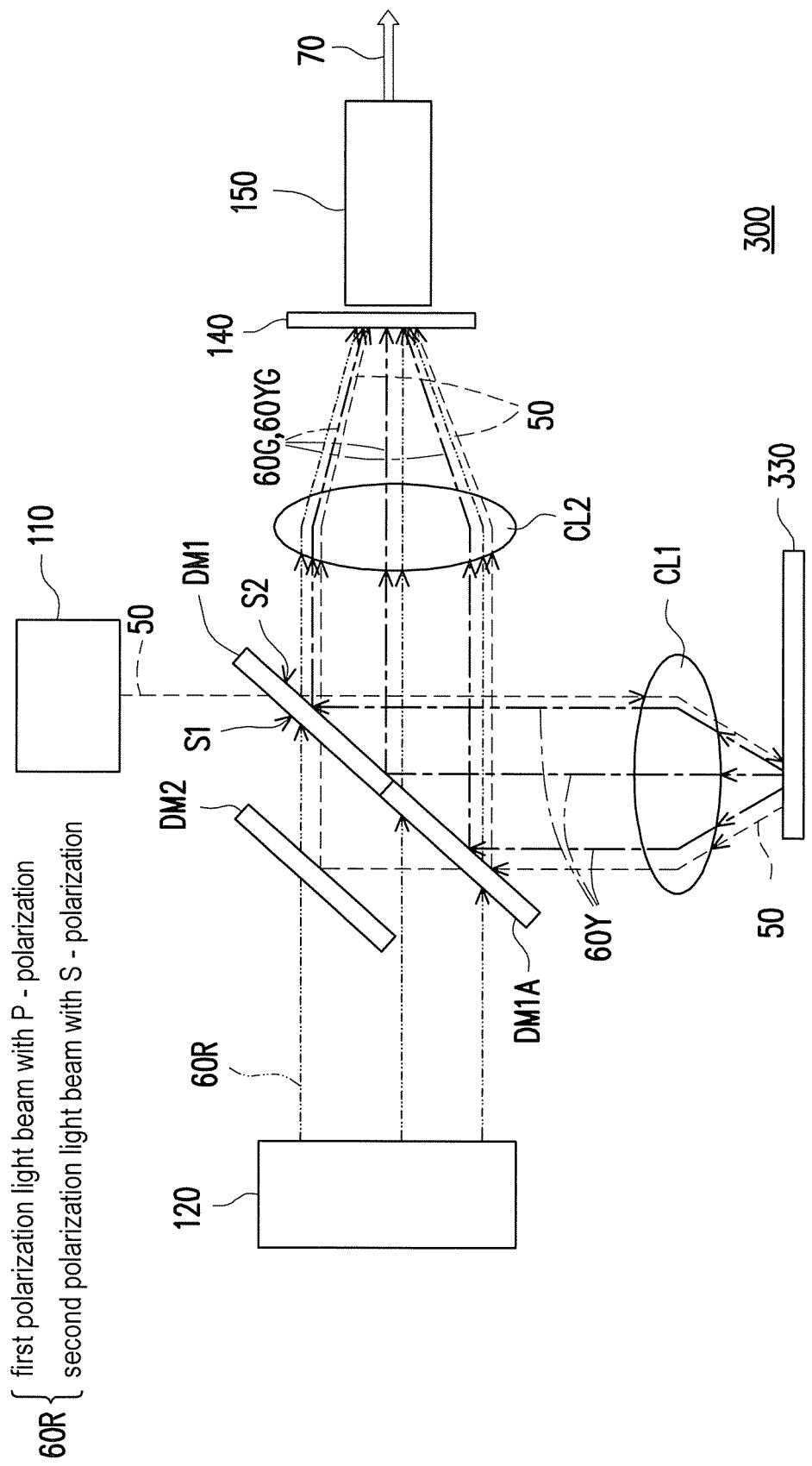
FIG. 3 is a schematic diagram of an optical structure of another illumination system of FIG. 1.

FIG. 3 is a schematic diagram of an optical structure of another illumination system of FIG. 1. With reference to FIG. 3, an illumination system 300 of FIG. 3 is similar to the illumination system 100 of FIG. 1, and a difference therebetween is described as follows. A wavelength conversion module 330 of the illumination system 300 is a reflective wavelength conversion module. That is, a non-conversion region (not shown) of the wavelength conversion module 330 is configured to reflect the excitation light beam 50 to be transmitted to the subsequent optical devices. Further, as shown in FIG. 3, the illumination system 300 includes different dichroic devices including a dichroic device DM1, a dichroic device DM1A, and a dichroic device DM2, a first condensing lens group CL1, and a second condensing lens group CL2.

The dichroic device DM1 and the dichroic device DM1A are located on the transmission path of the auxiliary light beam 60R. To be specific, in this embodiment, the dichroic device DM1 may reflect part of the second color light 60YG and the third color light 60G in the wavelength conversion light beam 60Y from the wavelength conversion module 330 and allows the excitation light beam 50 and the auxiliary light beam 60R from the auxiliary light source 120 to penetrate through. The dichroic device DM1A may have both of functions of a blue light half reflection half transmission device (BHM) and a dichroic mirror (DMGO). For example, the dichroic device DM1A may be respectively plated with different dichroic films on two opposite surfaces thereof, where one surface thereof has the function of the blue light half reflection half transmission effect, and the other surface have the function of reflecting the light beam with green-orange wavelength spectrum, that is, the function of the dichroic mirror (DMGO). When the dichroic device DM1A provides the function of the dichroic mirror (DMGO), the transmittance curve provided by the dichroic device DM1A for color light in different wavebands in the light-emitting spectrum is identical to that provided by the dichroic device DM1. In this way, the dichroic device DM1A allows a part of the excitation light beam 50 from the wavelength conversion module 330 to penetrate through, reflects the other part of the excitation light beam 50, allows the auxiliary light beam 60R from the auxiliary light source 120 to penetrate through as well, and also reflects the second color light 60YG and the third color light 60G in the wavelength conversion light beam 60Y from the wavelength conversion module 330.

From another perspective, the dichroic device DM2 is, for example, a dichroic mirror (DMB) which reflects blue light and thereby allows the auxiliary light beam 60R to penetrate through and reflects the excitation light beam 50. In this way, as shown in FIG. 3, in the embodiment, the auxiliary light beam 60R may penetrate through the dichroic device DM2, is transmitted to the dichroic device DM1, and then penetrates through the dichroic device DM1. Moreover, the auxiliary light beam 60R may be transmitted to the dichroic device DM1A and then penetrates through the dichroic device DM1A. Next, as shown in FIG. 3, in the embodiment, the auxiliary light beam 60R from the dichroic device DM1 and the dichroic device DM1A, the excitation light beam 50, and the second color light 60YG and the third color light 60G in the wavelength conversion light beam 60Y are transmitted to the filter module 140 and the light homogenizing device 150 after passing through the second condensing lens group CL2 and then are combined to form the illumination beam 70.

In this way, as the auxiliary light source 120 is disposed in the illumination system 100 adopting the dichroic device DM1 and the dichroic device DM1A, the ratio of red light in the illumination beam 70 is increased, so that the performance of red color in the projection frame is enhanced. Moreover, as the dichroic devices DM1 and DM1A are disposed in the illumination system 100, the outputted light beam may thereby exhibit favorable color performance and light efficiency. Further, in the embodiment, since similar dichroic devices DM1 and DM1A are adopted by the illumination system 300 and the illumination system 100 of FIG. 1, the illumination system 300 may provide effects and advantages similar to that provided by the illumination system 100, and similar description thereof is thus omitted herein. Furthermore, when the illumination system 300 is applied to the projection apparatus 200, the projection apparatus 200 may thereby feature similar effects and advantages, and similar description is thus omitted herein.

Figure 4:
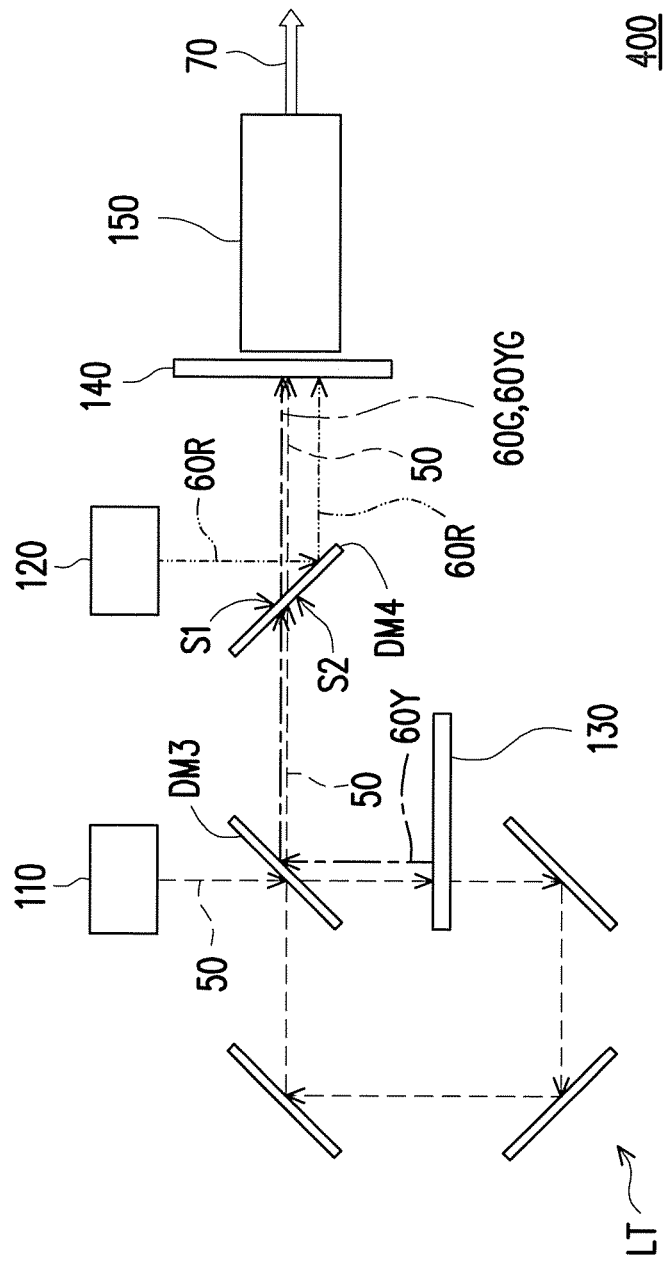
FIG. 4 is a schematic diagram of an optical structure of another illumination system of FIG. 1.

FIG. 4 is a schematic diagram of an optical structure of another illumination system of FIG. 1. With reference to FIG. 4, an illumination system 400 of FIG. 4 is similar to the illumination system 100 of FIG. 1, and a difference therebetween is described as follows. In the illumination system 400, a dichroic device DM3 located between the wavelength conversion module 130 and the excitation light source 110 is a dichroic mirror (DMY) which reflects yellow light and allows blue light to penetrate through. Therefore, the dichroic device DM3 may allow the blue excitation light beam 50 to penetrate through. In this way, the excitation light beam 50 of the excitation light source 110 may be transmitted to the wavelength conversion module 130 by penetrating through the dichroic device DM3. Nevertheless, the dichroic device DM3 is not located on the transmission path of the auxiliary light beam 60R. The dichroic device DM3 may also be a dichroic mirror (DMGO) which reflects a light beam of green-orange spectrum, for example.

From another perspective, in the illumination system 400, a dichroic device DM4 located on the transmission path of the auxiliary light beam 60R is a dichroic mirror (DMR) which reflects red light and allows green light, yellow light, orange light, or blue light to pass through. The dichroic device DM4 has a first surface S1 and a second surface S2 opposite to each other. The first surface S1 of the dichroic device DM4 faces the auxiliary light source 120, and the second surface S2 faces the wavelength conversion module 130. Further, as shown in FIG. 4, the first surface S1 of the dichroic device DM4 faces the auxiliary light beam 60R from the auxiliary light source 120, and the second surface S2 faces the wavelength conversion light beam 60Y from the wavelength conversion module 130. In this way, as shown in FIG. 1, in this embodiment, the auxiliary light beam 60R enters the dichroic device DM4 from the first surface S1 and then exits the dichroic device DM4 through the first surface S1 after being reflected by the dichroic device DM4. The at least one excitation light beam 50 and the wavelength conversion light beam 60Y enter the dichroic device DM4 through the second surface S2 and then exit the dichroic device DM4 through the first surface S1 after penetrating through the dichroic device DM4.

The process of the auxiliary light beam 60R and the wavelength conversion light beam 60Y passing through the dichroic device DM4 is further explained with reference to FIG. 5A.

Figure 5A:
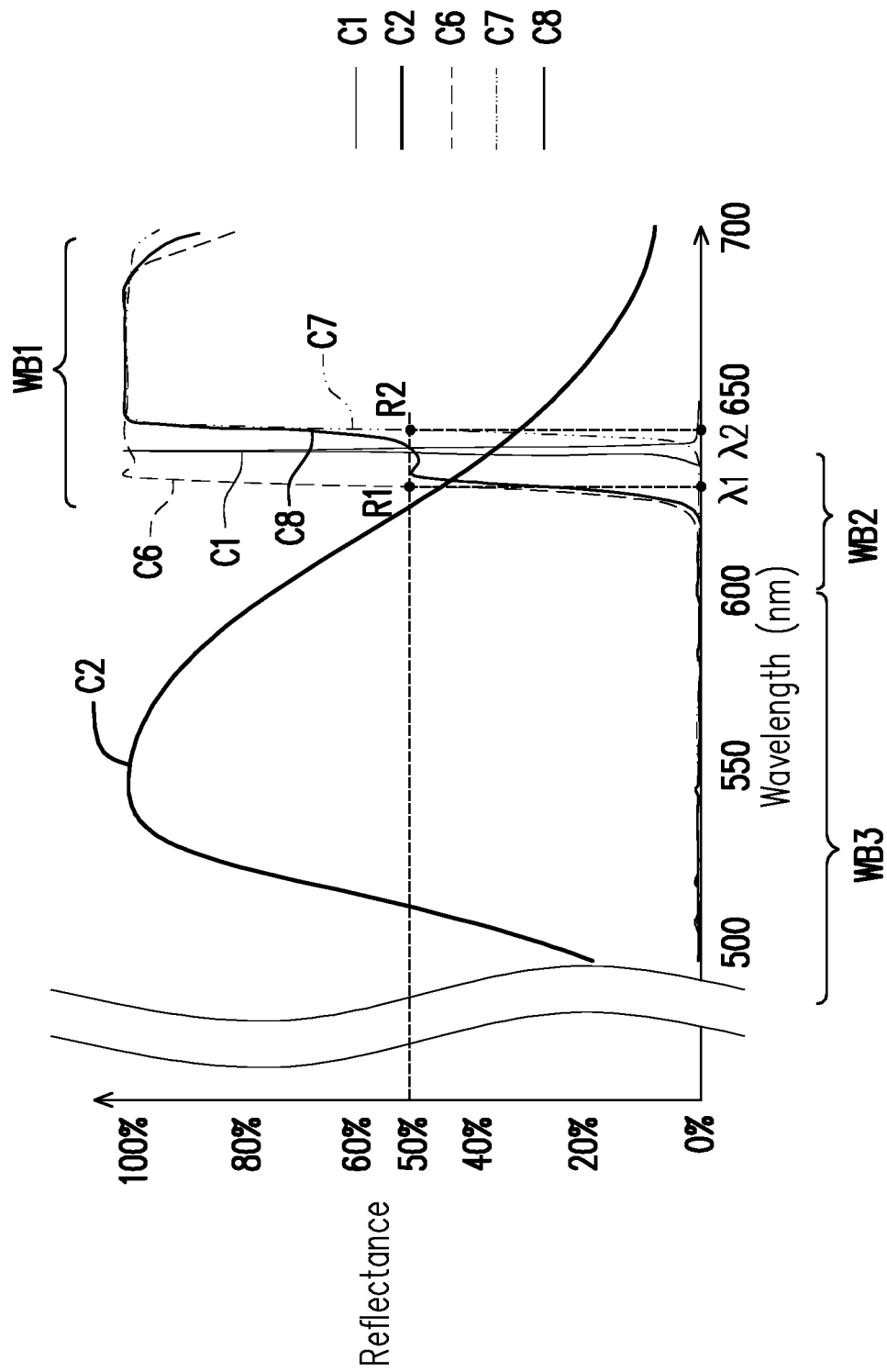
FIG. 5A is a graph showing relations between different wavelengths and reflectance of light beams passing through a dichroic device of FIG. 4.

FIG. 5A is a graph showing relations between different wavelengths and reflectance of light beams having light-emitting wavebands between a waveband range of 490 nm and 700 nm passing through the dichroic device DM4 of FIG. 4. As shown in FIG. 5A, in this embodiment, a curve C1 represents a light-emitting spectrum of the auxiliary light beam 60R. A curve C2 represents a light-emitting spectrum of the wavelength conversion light beam 60Y. A curve C6 represents reflectance provided by the dichroic device DM4 for color light having the first polarization state in different wavebands when an angle at which a light beam enters the dichroic device DM4 is greater than a predetermined angle. A curve C7 represents reflectance provided by the dichroic device DM4 for color light having the second polarization state in different wavebands when an angle at which a light beam enters the dichroic device DM4 is greater than a predetermined angle. A curve C8 represents reflectance provided by the dichroic device DM4 for color light having no specific polarization state in different wavebands. For instance, the predetermined angle may be 35 degrees.

As shown by the curves C6, C7, and C8 of FIG. 5A, in this embodiment, the dichroic device DM4 is configured to allow the first color light having the light-emitting wavelength range falling within the first waveband WB1 to penetrate through. For instance, in this embodiment, a range of the first waveband WB1 is, for example, greater than or equal to 610 nm. As shown by the curve C1 of FIG. 5A, the dominant wavelength of the auxiliary light beam 60R is, for example, 638 nm. In other words, in this embodiment, the first color light is red light, and the light-emitting wavelength range of the auxiliary light beam 60R falls within the first waveband WB1 and thereby is configured to be reflected by the dichroic device DM4.

More specifically, as shown by the curve C6 of FIG. 5A, when an angle at which a light beam enters the dichroic device DM4 is greater than the predetermined angle, for example, greater than 35 degrees, the curve C6 has a first half-reflection point R1. The first half-reflection point R1 refers to a point of reflectance of 50% provided to a light beam having the first polarization state and having the first wavelength $\lambda 1$ by the dichroic device DM4. Further, as shown by the curve C7 of FIG. 5A, when an angle at which a light beam enters the dichroic device DM4 is greater than the predetermined angle, for example, greater than 35 degrees, the curve C7 has a second half-reflection point R2, and a light beam having the second polarization state and having the second wavelength $\lambda 2$ is provided with the reflectance of 50%. In other words, when a dominant wavelength of the light beam having the first polarization state is greater than the first wavelength $\lambda 1$, a major portion (greater than 50%) of the light beam may be reflected by the dichroic device DM4. When a dominant wavelength of the light beam having the second polarization state is greater than the second wavelength $\lambda 2$, a major portion (greater than 50%) of the light beam may be reflected by the dichroic device DM4 as well. More specifically, as shown in FIG. 5A, in this embodiment, the first wavelength $\lambda 1$ is different from the second wavelength $\lambda 2$, and the second wavelength $\lambda 2$ is greater than the first wavelength $\lambda 1$. For instance, as shown in FIG. 5A, in this embodiment, the first wavelength $\lambda 1$ is greater than or equal to 615 nm and may be 620 nm, and the second wavelength $\lambda 2$ may be 645 nm. Further, a difference between the first wavelength $\lambda 1$ and the second wavelength $\lambda 2$ is greater than or equal to 5 nm.

Moreover, the auxiliary light beam 60R is a polarization light beam, and in the auxiliary light beam 60R, a value of ratio of light intensity of the first polarization light beam having the first polarization state to light intensity of the second polarization light beam having the second polarization state is greater than or equal to 20. Therefore, in the embodiment, as long as the first wavelength $\lambda 1$ is controlled to be less than or equal to the dominant wavelength of the auxiliary light beam 60R, 90% or greater of the auxiliary light beam 60R may be reflected by the dichroic device DM4. For instance, as shown by FIG. 5A, in this embodiment, a value of the dominant wavelength of the auxiliary light beam 60R is between that of the first wavelength $\lambda 1$ and that of the second wavelength $\lambda 2$. That is, the first wavelength $\lambda 1$ is less than or equal to the dominant wavelength of the auxiliary light beam 60R, and the second wavelength $\lambda 2$ is greater than the dominant wavelength of the auxiliary light beam 60R. Moreover, a difference between the first wavelength $\lambda 1$ and the dominant wavelength of the auxiliary light beam 60R may be greater than or equal to, for example, 3 nm. In addition, in this embodiment, as shown by FIG. 5A, both the first wavelength $\lambda 1$ and the second wavelength $\lambda 2$ are greater than the dominant wavelength of the wavelength conversion light beam 60Y.

From another perspective, as shown by the curves C6, C7, and C8 of FIG. 5A, the dichroic device DM4 is configured to allow the second color light 60YG having a light-emitting wavelength range falling within the second waveband WB2 and the third color light 60G having a light-emitting wavelength range falling within the waveband WB3 to penetrate through. For instance, in this embodiment, the range of the second waveband WB2 is between for example, 600 nm and 630 nm, and preferably 600 nm and 620 nm, and the range of the third waveband WB3 is between, for example, 490 nm and 600 nm. In other words, in this embodiment, the second color light 60YG is yellow green light, and the third color light 60G is green light. Further, as shown by the curve C2 of FIG. 5A, the light-emitting wavelength range of the wavelength conversion light beam 60Y includes the first waveband WB1, the second waveband WB2, and the third waveband WB3. As such, in the wavelength conversion light beam 60Y, light beams having the light-emitting wavelength ranges falling within the second waveband WB2 and the third waveband WB3 are configured to penetrate through the dichroic device DM4. In other words, in this embodiment, a portion of the wavelength conversion light beam 60Y may penetrate through the dichroic device DM4 to form the second color light 60YG and the third color light 60G. In this way, the excitation light beam 50, the auxiliary light beam 60R, and the second color light 60YG and the third color light 60G of the wavelength conversion light beam 60Y may be transmitted to the subsequent filter module 140 after exiting the dichroic device DM4 and then are combined to form the illumination beam 70.

Figure 5B:
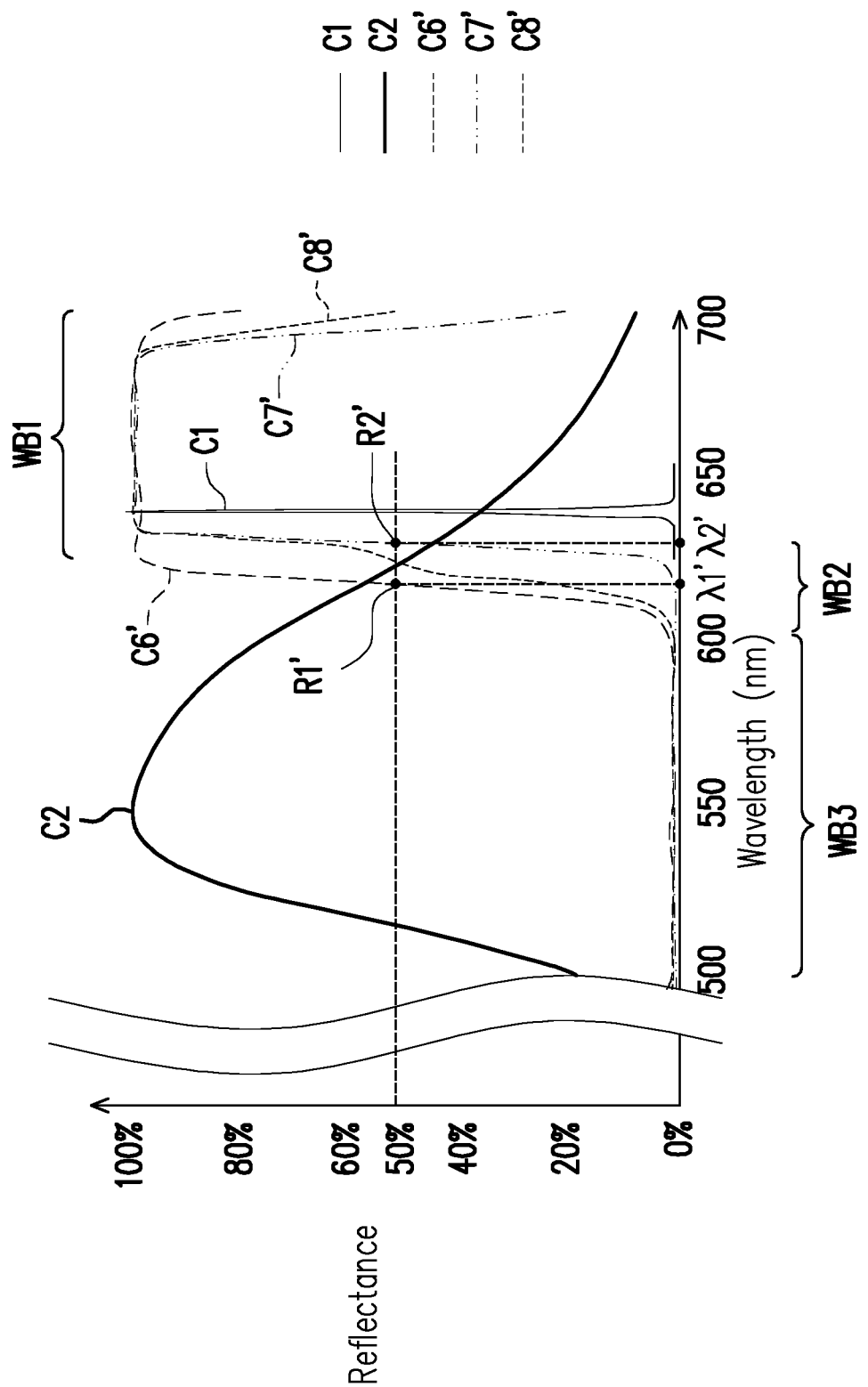
FIG. 5B is a graph showing relations between different wavelengths and reflectance of light beams passing through a dichroic device of a comparative example.
Figure 5C:
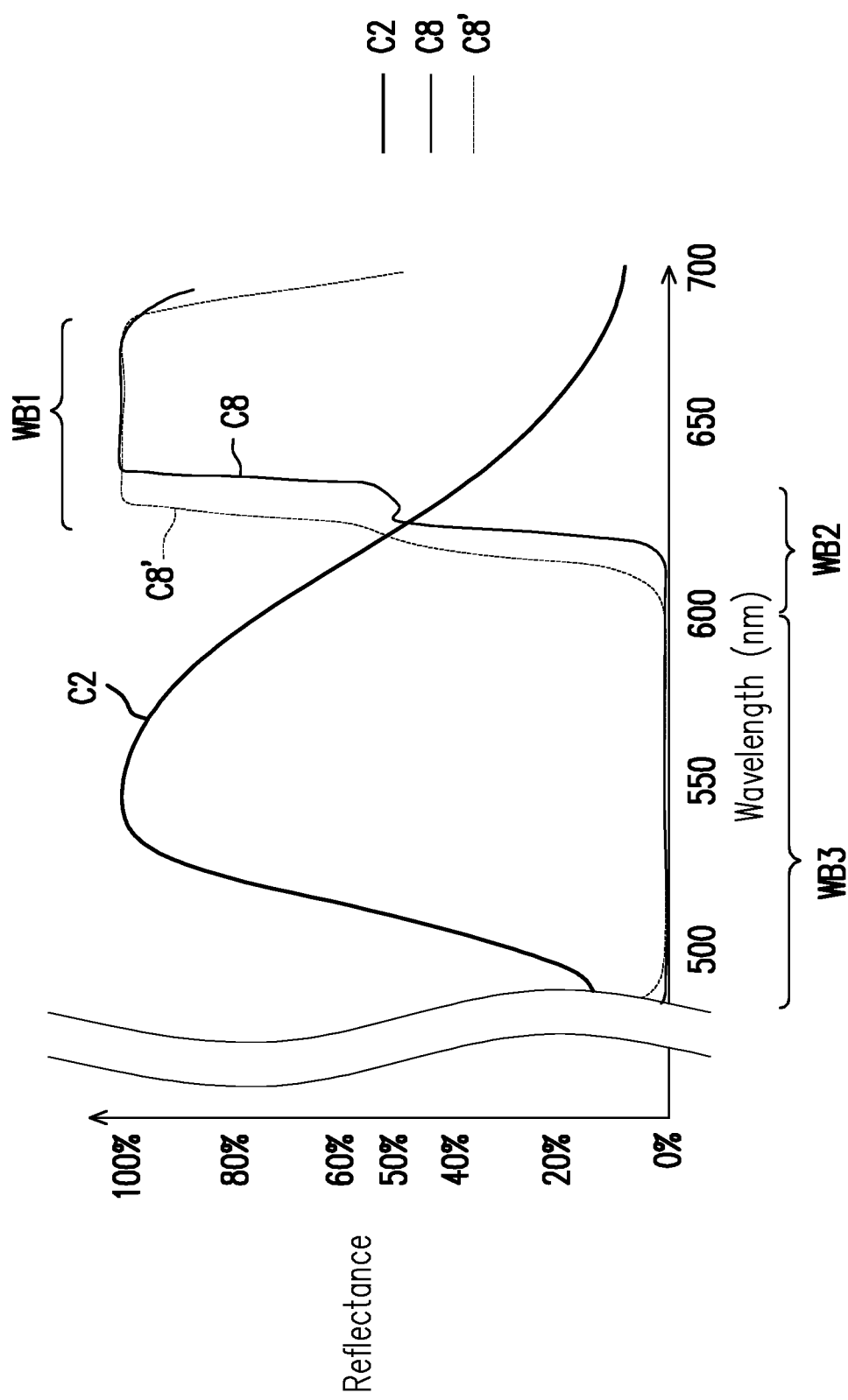
FIG. 5C is a graph showing relations between reflectance and the light-emitting wavelength of the wavelength conversion light beam comparing between the dichroic device of FIG. 4 and the dichroic device of the comparative example of FIG. 5B.

FIG. 5B is a graph showing relations between different wavelengths and reflectance of light beams passing through a dichroic device DM4' of a comparative example. Moreover, the dichroic device DM4' of FIG. 5B is a conventional dichroic device. FIG. 5C is a graph showing relations between reflectance and light-emitting wavelength of the wavelength conversion light beam 60Y comparing between the dichroic device DM4 of FIG. 4 and the dichroic device DM4' of the comparative example of FIG. 5B. With reference to FIG. 5B and FIG. 5C, a curve C6' represents reflectance provided by the dichroic device DM4' of the comparative example of FIG. 5B for color light having the first polarization state in different wavebands when an angle at which a light beam enters the dichroic device DM4' of the comparative example of FIG. 5B is greater than a predetermined angle. A curve C7' represents reflectance provided by the dichroic device DM4' of the comparative example of FIG. 5B for color light having the second polarization state in different wavebands when an angle at which a light beam enters the dichroic device DM4' of the comparative example of FIG. 5B is greater than the predetermined angle. A curve C8' represents reflectance provided by the dichroic device DM4' of the comparative example of FIG. 5B for color light having no specific polarization state in different wavebands. For instance, the predetermined angle may be 35 degrees.

With reference to FIG. 5B, a difference between the dichroic device DM4' adopted by FIG. 5B and the dichroic device DM4 adopted by FIG. 5A is described as follows. In this embodiment, as regards the dichroic device DM4' adopted by FIG. 5B, as shown by the curve C6', when an angle at which a light beam enters the dichroic device DM4' is greater than the predetermined angle, for example, greater than 35 degrees, the curve C6' has a first half-reflection point R1'. The first half-reflection point R1' refers to a point of reflectance of 50% provided to a light beam having the first polarization state and having the first wavelength $\lambda 1'$ by the dichroic device DM4'. Further, as shown by the curve C7, when an angle at which a light beam enters the dichroic device DM1' is greater than the predetermined angle, for example, greater than 35 degrees, the curve C7' has a second half-reflection point R2', and a light beam having the second polarization state and having the second wavelength $\lambda 2'$ is provided with the reflectance of 50%. Herein, positions of the first half-reflection point R1' and the second half-reflection point R2' shown by the curve C6' and the curve C7' on the spectrum are different from that of the first half-reflection point R1 and the second half-reflection point R2 of the dichroic device DM4 adopted by FIG. 5A on the spectrum. Compared to the first half-reflection point R1 and the second half-reflection point R2, the first half-reflection point R1' and the second half-reflection point R2' move to the range of the dominant wavelength of the wavelength conversion light beam 60Y. More specifically, in the comparative example of the dichroic device DM4' adopted by FIG. 5B, the first wavelength $\lambda 1'$ and the second wavelength $\lambda 2'$ are both less than the dominant wavelength of the auxiliary light beam 60R. For instance, as shown by FIG. 5B, in this embodiment, the first wavelength $\lambda 1'$ is approximately 605 nm and the second wavelength $\lambda 2'$ is approximately 630 nm.

As such, as shown by the curves C6', C7', and C8' of FIG. 5B, since the first half-reflection point R1' and the second half-reflection point R2' of the curves C6' and CT move their positions on the spectrum, the curve C8' of FIG. 5B changes as well. The waveband range having reflectance approximately near zero is reduced to between 490 nm and 590 nm. That is, the conventional dichroic device DM4' adopted by FIG. 5B is only configured to allow the third color light 60G having the light-emitting wavelength range falling within the third waveband WB3 to penetrate through. The second color light 60YG having the light-emitting wavelength range falling within the second waveband WB2 is reflected by the conventional dichroic device DM4' adopted by FIG. 5B. The second color light 60YG thereby does not penetrate through the conventional dichroic device DM4' and is transmitted to the subsequent filter module 140, and as such, loss of light efficiency is generated.

In this way, as shown in FIG. 5C, when the dichroic device DM4 adopted by FIG. 5A and the conventional dichroic device DM4' adopted by FIG. 5B are compared, it can be seen that the dichroic device DM4 of FIG. 5A is configured to allow a light beam having a broader waveband range to penetrate through. Moreover, when the first wavelength $\lambda 1$ is controlled to be less than or equal to the dominant wavelength of the auxiliary light beam 60R, 90% or greater of the auxiliary light beam 60R having the first polarization state may be reflected by the dichroic device DM4. Therefore, when the auxiliary light beam 60R is ensured to be reflected by the dichroic device DM4, the dichroic device DM4 adopted by FIG. 5A may allow the second color light 60YG having the light-emitting wavelength range falling within the second waveband WB2 to penetrate through the dichroic device DM4 as well, so that utilization efficiency of the yellow green light is enhanced. In this way, as the auxiliary light source 120 is disposed in the illumination system 400 adopting the dichroic device DM4, the ratio of red light in the illumination beam 70 is increased, so that the performance of red color in the projection frame is enhanced. Moreover, as the dichroic device DM4 is disposed in the illumination system 400, the outputted light beam may thereby exhibit favorable color performance and light efficiency. Furthermore, when the illumination system 400 is applied to the projection apparatus 200, the projection apparatus 200 may thereby feature similar effects and advantages, and similar description is thus omitted herein.

Figure 6:
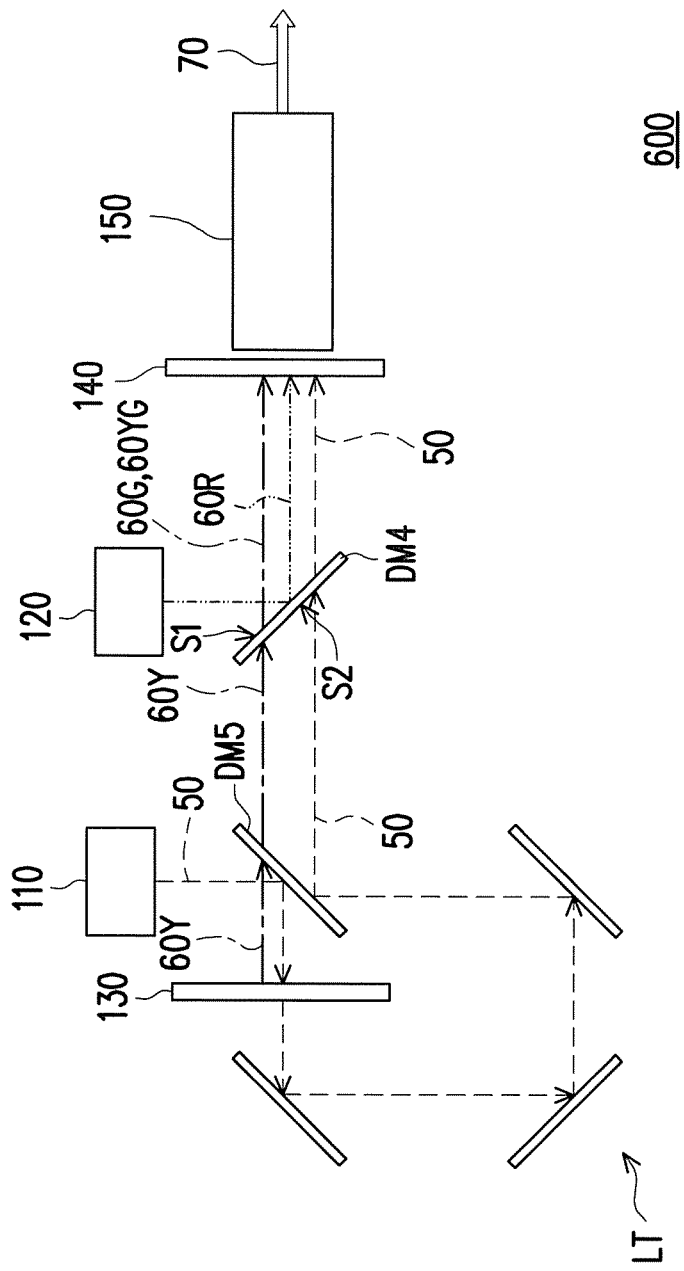
FIG. 6 to FIG. 8 are schematic diagrams of optical structures of various illumination systems of FIG. 1.
Figure 7:
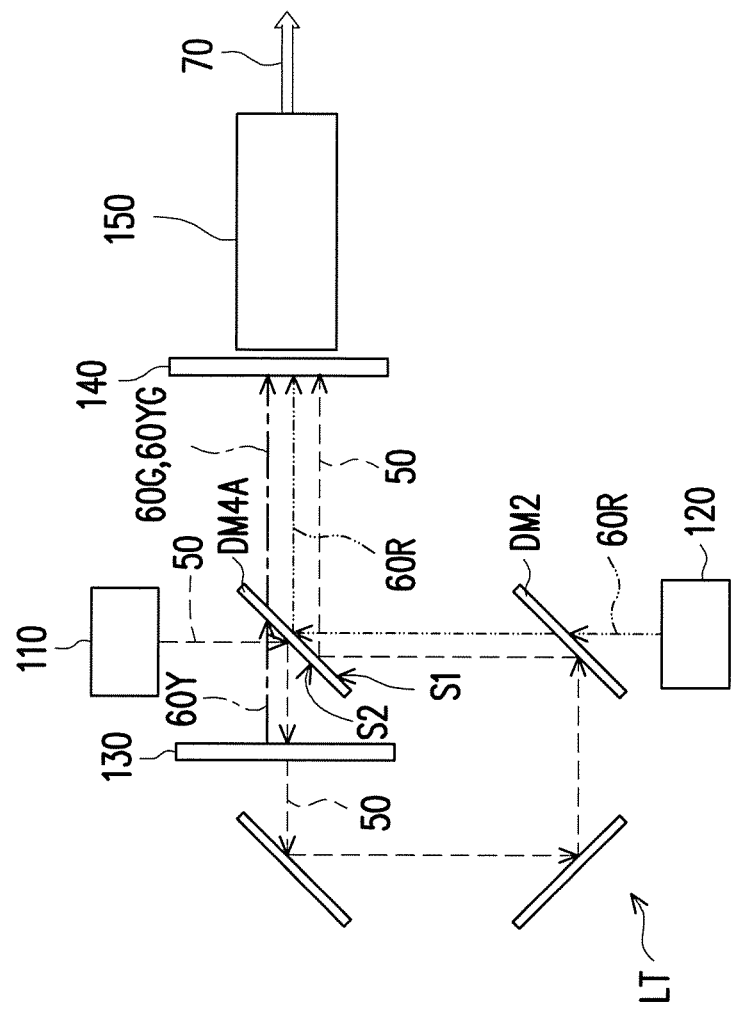
Figure 8:
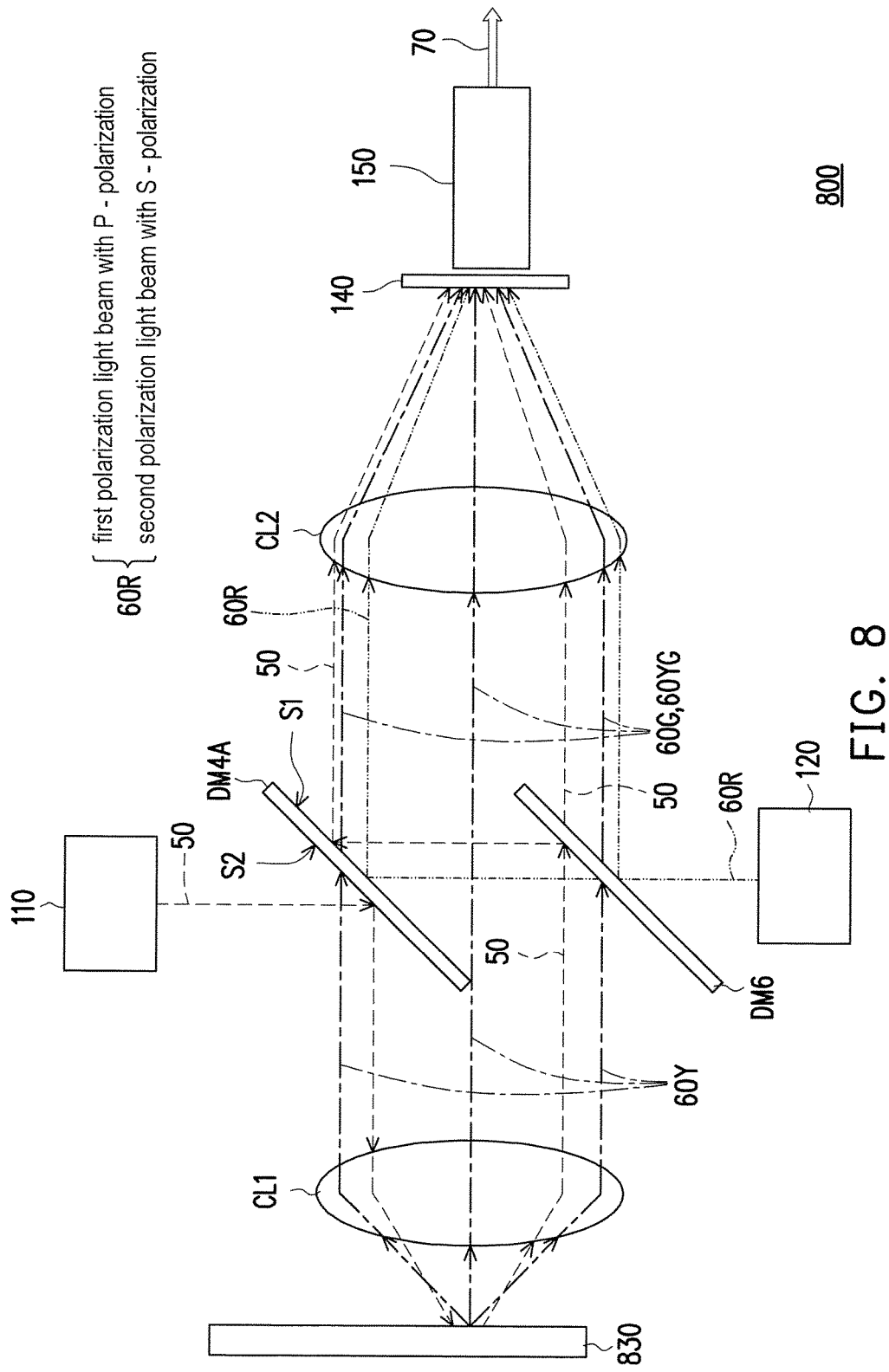

FIG. 6 to FIG. 8 are schematic diagrams of optical structures of various illumination systems of FIG. 1. With reference to FIG. 6, an illumination system 600 of FIG. 6 is similar to the illumination system 400 of FIG. 4, and a difference therebetween is described as follows. A dichroic device DM5 located between the wavelength conversion module 130 and the excitation light source 110 is a dichroic mirror (DMB) which reflects blue light, and thereby, the dichroic device DM5 allows yellow light or green light to penetrate through and reflects blue light. The wavelength conversion module 130 is disposed on the transmission path of the excitation light beam 50 reflected by the dichroic device DM5. In this way, the excitation light beam 50 of the excitation light source 110 may be reflected by the dichroic device DM5 and is then transmitted to the wavelength conversion module 130. Another dichroic device DM4 is located on the transmission paths of the auxiliary light beam 60R, the excitation light beam 50 from the wavelength conversion module 130, and the wavelength conversion light beam 60Y, is configured to reflect the auxiliary light beam 60R, and allows the excitation light beam 50 and the second color light 60YG and the third color light 60G of the wavelength conversion light beam 60Y to penetrate through. In this way, as shown in FIG. 6, the auxiliary light beam 60R, the excitation light beam 50, and the second color light 60YG and the third color light 60G of the wavelength conversion light beam 60Y may be transmitted to the subsequent filter module 140 and the light homogenizing device 150 through the dichroic device DM4 and then are combined to form the illumination beam 70.

In this way, as the auxiliary light source 120 is disposed in the illumination system 600 adopting the dichroic device DM4, the ratio of red light in the illumination beam 70 is increased, so that the performance of red color in the projection frame is enhanced. Moreover, as the dichroic device DM4 is disposed in the illumination system 600, the outputted light beam may thereby exhibit favorable color performance and light efficiency. Further, in the embodiment, since the same dichroic device DM4 is adopted by the illumination system 600 and the illumination system 400 of FIG. 4 and similar optical path configurations are adopted, the illumination system 600 may provide effects and advantages similar to that provided by the illumination system 400, and similar description thereof is thus omitted herein. Furthermore, when the illumination system 600 is applied to the projection apparatus 200, the projection apparatus 200 may thereby feature similar effects and advantages, and similar description is thus omitted herein.

With reference to FIG. 7, an illumination system 700 of FIG. 7 is similar to the illumination system 600 of FIG. 6, and a difference therebetween is described as follows. A dichroic device DM4A located between the wavelength conversion module 130 and the excitation light source 110 is also located on the transmission paths of the auxiliary light beam 60R, the excitation light beam 50 from the wavelength conversion module 130, and the wavelength conversion light beam 60Y. Therefore, the dichroic device DM4A is configured to reflect the excitation light beam 50, but the dichroic device DM4A is also configured to reflect the auxiliary light beam 60R and allows the second color light 60YG and the third color light 60G of the wavelength conversion light beam 60Y to pass through. That is, the dichroic device DM4A is a dichroic mirror (DMBR) which reflects blue light and red light and allows a light beam of green-orange spectrum to penetrate through. Nevertheless, the function provided by the dichroic device DM4A for light beams of different wavelengths having light-emitting wavebands falling within the waveband range of 490 nm to 700 nm is similar to the function provided by the dichroic device DM4.

Moreover, the dichroic device DM2 is also included in the light transmission module LT of the illumination system 700, and the dichroic device DM2 is located on the transmission paths of the excitation light beam 50 and the auxiliary light beam 60R. In this embodiment, the dichroic device DM2 may be a dichroic mirror (DMB) capable of, for example, reflecting blue light and thereby allows red light to penetrate through and reflects blue light. In this way, the auxiliary light beam 60R of the auxiliary light source 120 may penetrate through the dichroic device DM2 and is transmitted to the dichroic device DM4A, and the excitation light beam 50 may still be transmitted to the dichroic device DM4A through the light transmission module LT. In this way, as shown in FIG. 7, the auxiliary light beam 60R, the excitation light beam 50, and the second color light 60YG and the third color light 60G of the wavelength conversion light beam 60Y may be transmitted to the subsequent filter module 140 and the light homogenizing device 150 through the dichroic device DM4A and then are combined to form the illumination beam 70.

In this way, as the auxiliary light source 120 is disposed in the illumination system 700 adopting the dichroic device DM4A, the ratio of red light in the illumination beam 70 is increased, so that the performance of red color in the projection frame is enhanced. Moreover, as the dichroic device DM4A is disposed in the illumination system 700, the outputted light beam may thereby exhibit favorable color performance and light efficiency. In addition, in this embodiment, the function provided by the dichroic device DM4A of the illumination system 700 for light beams of different wavelengths having light-emitting wavebands falling within the waveband range of 490 nm to 700 nm is similar to the function provided by the dichroic device DM4 of the illumination system 400. Therefore, the illumination system 700 may feature effects and advantages similar to that provided by the illumination system 400, and similar description is thus omitted herein. Furthermore, when the illumination system 700 is applied to the projection apparatus 200, the projection apparatus 200 may thereby feature similar effects and advantages, and similar description is thus omitted herein.

With reference to FIG. 8, an illumination system 800 of FIG. 8 is similar to the illumination system 700 of FIG. 7, and a difference therebetween is described as follows. A wavelength conversion module 830 of the illumination system 100 is a reflective wavelength conversion module. That is, a non-conversion region (not shown) of the wavelength conversion module 830 is configured to reflect the excitation light beam 50. Further, as shown in FIG. 8, the illumination system 800 includes different dichroic devices including a dichroic device DM4A and a dichroic device DM6, a first condensing lens group CL1, and a second condensing lens group CL2.

The dichroic device DM4A and the dichroic device DM6 are located on the transmission path of the auxiliary light beam 60R. To be specific, in this embodiment, the dichroic device DM4A is a dichroic mirror (DMBR) which reflects blue light and red light. The dichroic device DM4A may thereby allow the light beam of green-orange wavelength spectrum to penetrate through and thus allows part of the second color light 60YG and the third color light 60G in the wavelength conversion light beam 60Y from the wavelength conversion module 830 to penetrate through and reflects the excitation light beam 50 and the auxiliary light beam 60R from the auxiliary light source 120. The dichroic device DM6 has the function of a red light and blue light half reflection and half transmission device (BRHM). That is, the dichroic device DM6 provides the function of half reflection and half transmission to red light and blue light, allows the excitation light beam 50 from the wavelength conversion module 830 and the auxiliary light beam 60R from the auxiliary light source 120 to penetrate through, and reflects the other parts of the excitation light beam 50 and the auxiliary light beam 60R.

In this way, as shown in FIG. 8, in this embodiment, the dichroic device DM6 allows one part of the auxiliary light beam 60R to penetrate through to be transmitted to the dichroic device DM4A and reflects the other part of the auxiliary light beam 60R to be transmitted to the second condensing lens group CL2. Further, as shown in FIG. 8, in this embodiment, the dichroic device DM4A may reflect the excitation light beam 50, reflects the excitation light beam 50 and the auxiliary light beam 60R from the dichroic device DM6, and allows the second color light 60YG and the third color light 60G from the wavelength conversion module 830 to penetrate through. In this way, the auxiliary light beam 60R from the dichroic device DM4 and the dichroic device DM6, the excitation light beam 50, and the second color light 60YG and the third color light 60G in the wavelength conversion light beam 60Y are transmitted to the filter module 140 and the light homogenizing device 150 after passing through the second condensing lens group CL2 and then are combined to form the illumination beam 70.

In this way, as the auxiliary light source 120 is disposed in the illumination system 800 adopting the dichroic device DM4A, the ratio of red light in the illumination beam 70 is increased, so that the performance of red color in the projection frame is enhanced. Moreover, as the dichroic device DM4A is disposed in the illumination system 800, the outputted light beam may thereby exhibit favorable color performance and light efficiency. Further, in the embodiment, since the same dichroic device DM4A is adopted by the illumination system 800 and the illumination system 700 of FIG. 7, the illumination system 800 may provide effects and advantages similar to that provided by the illumination system 700, and similar description thereof is thus omitted herein. Furthermore, when the illumination system 800 is applied to the projection apparatus 200, the projection apparatus 200 may thereby feature similar effects and advantages, and similar description is thus omitted herein.

In view of the foregoing, the embodiments of the invention have at least one of the following advantages or effects. In the embodiments of the invention, as the auxiliary light source is disposed in the illumination system adopting the specific dichroic device, the ratio of red light in the illumination beam is increased, so that the performance of red color in the projection frame is enhanced. Moreover, as the specific dichroic device is disposed in the illumination system, the outputted light beam may thereby exhibit favorable color performance and light efficiency. Further, the projection apparatus adopting the illumination system having the specific dichroic device may thereby present favorable color performance and image frames.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illumination system, configured to provide an illumination beam, and comprising: an excitation light source, configured to emit an excitation light beam; an auxiliary light source, configured to emit an auxiliary light beam, wherein the auxiliary light beam has a first polarization light beam and a second polarization light beam, the first polarization light beam has a first polarization state, and the second polarization light beam has a second polarization state, and a dichroic device, located on the transmission path of the auxiliary light beam, wherein the dichroic device provides a light beam having the first polarization state and having a first wavelength with transmittance of 50% and provides the light beam having the second polarization state and having a second wavelength with transmittance of 50% when an angle at which the light beam enters the dichroic device is greater than a predetermined angle, the first wavelength is different from the second wavelength, and the first wavelength is less than or equal to a dominant wavelength of the auxiliary light beam.

2. The illumination system as claimed in claim 1, wherein a difference between the first wavelength and the second wavelength is greater than or equal to 5 nanometers.

3. The illumination system as claimed in claim 1, wherein the second wavelength is greater than the first wavelength.

4. The illumination system as claimed in claim 1, wherein the first wavelength is greater than or equal to 615 nanometers.

5. The illumination system as claimed in claim 1, wherein a difference between the first wavelength and the dominant wavelength of the auxiliary light beam is greater than or equal to 3 nanometers.

6. The illumination system as claimed in claim 1, wherein a value of the dominant wavelength of the auxiliary light beam is between that of the first wavelength and that of the second wavelength.

7. The illumination system as claimed in claim 1, wherein the illumination system further comprises a wavelength conversion module located on a transmission path of the excitation light beam and configured to convert the excitation light beam to at least one wavelength conversion light beam, the dichroic device is located on a transmission path of the at least one wavelength conversion light beam, and the auxiliary light beam and the at least one wavelength conversion light beam form the illumination beam through the dichroic device.

8. The illumination system as claimed in claim 7, wherein the dichroic device has a first surface and a second surface opposite to each other, the auxiliary light beam enters the dichroic device through one of the first surface and the second surface, the at least one wavelength conversion light beam enters the dichroic device through the other one of the first surface and the second surface, and both the auxiliary light beam and the at least one wavelength conversion light beam exit the dichroic device through the same one of the first surface and the second surface.

9. The illumination system as claimed in claim 7, wherein the dichroic device is configured to allow first color light having a light-emitting wavelength range falling within a first waveband to penetrate through, the dichroic device is configured to reflect second color light having a light-emitting wavelength range falling within a second waveband, the second waveband is between 600 nanometers and 630 nanometers, a light-emitting wavelength range of the auxiliary light beam falls within the first waveband, and a light-emitting wavelength range of the at least one wavelength conversion light beam comprises the second waveband.

10. The illumination system as claimed in claim 7, wherein the dichroic device is configured to reflect first color light having a light-emitting wavelength range falling within a first waveband, the dichroic device is configured to allow second color light having a light-emitting wavelength range falling within a second waveband to penetrate through, the second waveband is between 600 nanometers and 630 nanometers, a light-emitting wavelength range of the auxiliary light beam falls within the first waveband, and a light-emitting wavelength range of the at least one wavelength conversion light beam comprises the second waveband.

11. A projection apparatus, comprising: an illumination system, configured to provide an illumination beam, and comprising: an excitation light source, configured to emit an excitation light beam; an auxiliary light source, configured to emit an auxiliary light beam, wherein the auxiliary light beam has a first polarization light beam and a second polarization light beam, the first polarization light beam has a first polarization state, and the second polarization light beam has a second polarization state, and a dichroic device, located on the transmission path of the auxiliary light beam, wherein the dichroic device provides alight beam having the first polarization state and having a first wavelength with transmittance of 50%, and the dichroic device provides the light beam having the second polarization state and having a second wavelength with transmittance of 50% when an angle at which the light beam enters the dichroic device is greater than a predetermined angle, the first wavelength is different from the second wavelength, and the first wavelength is less than or equal to a dominant wavelength of the auxiliary light beam; alight valve, located on a transmission path of the illumination beam and configured to form the illumination beam into an image beam; and a projection lens, located on a transmission path of the image beam and configured to form the image beam into a projection light beam.

12. The projection apparatus as claimed in claim 11, wherein a difference between the first wavelength and the second wavelength is greater than or equal to 5 nanometers.

13. The projection apparatus as claimed in claim 11, wherein the second wavelength is greater than the first wavelength.

14. The projection apparatus as claimed in claim 11, wherein the first wavelength is greater than or equal to 615 nanometers.

15. The projection apparatus as claimed in claim 11, wherein a difference between the first wavelength and the dominant wavelength of the auxiliary light beam is greater than or equal to 3 nanometers.

16. The projection apparatus as claimed in claim 11, wherein a value of the dominant wavelength of the auxiliary light beam is between that of the first wavelength and that of the second wavelength.

17. The projection apparatus as claimed in claim 11, wherein the projection apparatus further comprises a wavelength conversion module located on a transmission path of the excitation light beam and configured to convert the excitation light beam to at least one wavelength conversion light beam, the dichroic device is located on a transmission path of the at least one wavelength conversion light beam, and the auxiliary light beam and the at least one wavelength conversion light beam form the illumination beam through the dichroic device.

18. The projection apparatus as claimed in claim 17, wherein the dichroic device has a first surface and a second surface opposite to each other, the auxiliary light beam enters the dichroic device through one of the first surface and the second surface, the at least one wavelength conversion light beam enters the dichroic device through the other one of the first surface and the second surface, and both the auxiliary light beam and the at least one wavelength conversion light beam exit the dichroic device through the same one of the first surface and the second surface.

19. The projection apparatus as claimed in claim 17, wherein the dichroic device is configured to allow first color light having a light-emitting wavelength range falling within a first waveband to penetrate through, the dichroic device is configured to reflect second color light having a light-emitting wavelength range falling within a second waveband, the second waveband is between 600 nanometers and 630 nanometers, a light-emitting wavelength range of the auxiliary light beam falls within the first waveband, and a light-emitting wavelength range of the at least one wavelength conversion light beam comprises the second waveband.

20. The projection apparatus as claimed in claim 17, wherein the dichroic device is configured to reflect first color light having a light-emitting wavelength range falling within a first waveband, the dichroic device is configured to allow second color light having a light-emitting wavelength range falling within a second waveband to penetrate through, the second waveband is between 600 nanometers and 630 nanometers, a light-emitting wavelength range of the auxiliary light beam falls within the first waveband, and a light-emitting wavelength range of the at least one wavelength conversion light beam comprises the second waveband.

* * * * *